US011875764B2

(12) United States Patent
Plazak

(10) Patent No.: US 11,875,764 B2
(45) Date of Patent: Jan. 16, 2024

(54) DATA-DRIVEN AUTOSUGGESTION WITHIN MEDIA CONTENT CREATION

(71) Applicant: Avid Technology, Inc., Burlington, MA (US)

(72) Inventor: Joseph Plazak, Verdun (CA)

(73) Assignee: AVID TECHNOLOGY, INC., Burlington, MA (US)

( * ) Notice: Subject to any disclaimer, the term of this patent is extended or adjusted under 35 U.S.C. 154(b) by 492 days.

(21) Appl. No.: 17/215,758

(22) Filed: Mar. 29, 2021

(65) Prior Publication Data

US 2022/0310048 A1 Sep. 29, 2022

(51) Int. Cl.
*G10H 1/00* (2006.01)
*G10H 1/06* (2006.01)

(52) U.S. Cl.
CPC ............. *G10H 1/0025* (2013.01); *G10H 1/06* (2013.01); *G10H 2220/116* (2013.01); *G10H 2220/121* (2013.01)

(58) Field of Classification Search
CPC .. G10H 1/0025; G10H 1/06; G10H 2220/116; G10H 2220/121
USPC ........................................................... 84/645
See application file for complete search history.

(56) References Cited

U.S. PATENT DOCUMENTS 6,469,711 B2 * 10/2002 Foreman ................ G11B 27/34 375/E7.189
11,264,002 B2 * 3/2022 Ackerman ........... G11B 27/031
11,768,868 B2 * 9/2023 Gonsalves ............. G06N 3/084 706/25
2010/0293455 A1 * 11/2010 Bloch .................. G11B 27/031 715/255

(Continued)

FOREIGN PATENT DOCUMENTS

DE 11 2013 005 807 8/2015
DE 112013005807 T5 * 8/2015 ............... G10H 1/18

(Continued)

OTHER PUBLICATIONS

Hadjeres, Gaetan, et al., DeepBach: a Steerable Model for Bach Chorales Generation, arxiv.org/abs/1612.01010, Jun. 17, 2017, 10 pgs.

(Continued)

*Primary Examiner* — Christina M Schreiber
(74) *Attorney, Agent, or Firm* — Oliver Strimpel

(57) ABSTRACT

A media composition application, such as a musical score-writer or a digital audio workstation, provides in situ suggestions for continuation or completion of a media composition. The suggestions are based on some or all of the portion of the composition already composed or are based on a corpus of compositions, such as those by a particular composer or those of a specific genre. The length of the suggestions is specified by the user. The suggestions are provided within a graphical user interface of the application (Continued)

and displayed as a possible direct continuation of the composition within a musical stave. If the user rejects the suggestion, additional suggestions are automatically displayed in situ. Reductive, most-probable suggestions may be offered as well as exploratory suggestions that facilitate a creative compositional interaction between user and application. Data filters enable selected aspects of a data source to be used for suggestion generation.

20 Claims, 4 Drawing Sheets

(56) References Cited

U.S. PATENT DOCUMENTS

2014/0195026 A1* 7/2014 Wieder .................. H04L 67/60 700/94
2016/0170948 A1* 6/2016 Bloch .................. G11B 27/034 715/229
2017/0263228 A1* 9/2017 Silverstein ............... G06N 7/01
2019/0378482 A1* 12/2019 Vorobyev ............. G10H 1/0025
2020/0380940 A1* 12/2020 Abdallah ............. G10H 1/0066
2021/0295148 A1* 9/2021 Gonsalves ............. G06N 3/045
2021/0335334 A1* 10/2021 Ackerman ............. G06N 20/00
2022/0310048 A1* 9/2022 Plazak ................. G10H 1/0025

FOREIGN PATENT DOCUMENTS

EP 1994525 B1 * 10/2016 ........... G10H 1/0025
JP 4868483 B2 * 2/2012 ........... G10H 1/0025
WO WO-2010054842 A1 * 5/2010 ........... G09B 15/023

OTHER PUBLICATIONS

Huang, Cheng-Zhi Anna et al., The Boch Doodle: Approachable Music Composition With Machine Learning at Scale, arxiv.org/abs/1907.06637, Jun. 14, 2019, 8 pgs.

* cited by examiner

DATA-DRIVEN AUTOSUGGESTION WITHIN MEDIA CONTENT CREATION

BACKGROUND

Autocompletion is a common feature within text-based computer applications such as email, text messaging, and search engines. The feature provides suggestions to users for the continuation or conclusion of an entered text string. The autocompletion suggestions are based on data models generated from large corpora of text, sometimes compiled in part from a given user's previous text entries.

Although widely deployed within productivity software applications, the provision of autocompletion features has not been extended to other kinds of applications. There is therefore a need to provide the productivity benefits offered by autocompletion, such as efficiency and time-saving, to other software application areas, and, in particular, to the realm of applications for composing creative content, such as musical scorewriting applications and digital audio workstations.

SUMMARY

A media composition application includes an autosuggestion feature in which suggestions for creative content are provided while a user is in the process of composing a media composition. The autosuggestion is based on material drawn from the media composition itself, or from one or more other sources.

In general, in one aspect, a method of composing a media composition comprising: providing a media composition application; while a user of the media composition application is entering media content for the media composition into the media composition application, automatically displaying a first suggestion for a continuation of the media composition, wherein the suggestion is displayed: as a continuation of the media composition adjacent and sequential to a preceding portion of the media composition; and using a graphical style that distinguishes it from a graphical style of the preceding portion of the media composition; and enabling the user to accept or reject the first suggestion, wherein: when the user accepts the first suggestion, the first suggestion is incorporated into the composition and the first suggestion is redisplayed using the graphical style of the preceding portion of the media composition; and when the user rejects the first suggestion, a second suggestion for continuation of the media composition is automatically displayed.

Various embodiments include one or more of the following features. The media composition application is a musical scorewriter application. The suggestion is based on a portion of the media composition. The portion is the preceding portion of the media composition. The portion of the media composition is specified by the user. The suggestion is based on all of the media composition that has already been entered into the media composition application. The suggestion is based on a corpus of media compositions of a given genre. The suggestion is based on a corpus of media compositions composed by one or more composers. The suggestion is based on a first data source that comprises a plurality of aspects, and wherein the suggestion preserves a first aspect of the first data source and varies a second aspect of the plurality of aspects. The media composition application is a musical scorewriter, the first data source comprises a fragment of a musical score, and the first aspect is one of a rhythm of the fragment, a melody of the fragment, a harmony of the fragment, a lyric of the fragment, and a bass line of the fragment. The suggestion is further based on a second data source that comprises a plurality of aspects, and wherein the suggestion preserves a first aspect of the second data source and varies a second aspect of the second data source. The first aspect of the first data source is a melody aspect. The first aspect of the second data source is one of a rhythm aspect and a harmonization aspect. The length of the first suggestion matches the length of a portion of the media composition that has been selected to provide a basis from which the suggestion is to be generated. The length of the first suggestion is selectable by the user. The length of the first suggestion is automatically determined by the media composition application to fill a length required to complete the media composition.

In general, in another aspect, a computer program product comprises: a non-transitory computer-readable medium with computer-readable instructions encoded thereon, wherein the computer-readable instructions, when processed by a processing device instruct the processing device to perform a method of composing a media composition, the method comprising: providing a media composition application; while a user of the media composition application is entering media content for the media composition into the media composition application, automatically displaying a first suggestion for a continuation of the media composition, wherein the suggestion is displayed: as a continuation of the media composition adjacent and sequential to a preceding portion of the media composition; and using a graphical style that distinguishes it from a graphical style of the preceding portion of the media composition; and enabling the user to accept or reject the first suggestion, wherein: when the user accepts the first suggestion, the first suggestion is incorporated into the composition and the first suggestion is redisplayed using the graphical style of the preceding portion of the media composition; and when the user rejects the first suggestion, a second suggestion for continuation of the media composition is automatically displayed.

In general, in a further aspect, a system comprises: a memory for storing computer-readable instructions; and a processor connected to the memory, wherein the processor, when executing the computer-readable instructions, causes the system to perform a method of composing a media composition, the method comprising: providing a media composition application; while a user of the media composition application is entering media content for the media composition into the media composition application, automatically displaying a first suggestion for a continuation of the media composition, wherein the suggestion is displayed: as a continuation of the media composition adjacent and sequential to a preceding portion of the media composition; and using a graphical style that distinguishes it from a graphical style of the preceding portion of the media composition; and enabling the user to accept or reject the first suggestion, wherein: when the user accepts the first suggestion, the first suggestion is incorporated into the composition and the first suggestion is redisplayed using the graphical style of the preceding portion of the media composition; and when the user rejects the first suggestion, a second suggestion for continuation of the media composition is automatically displayed.

DETAILED DESCRIPTION

Figure 1:
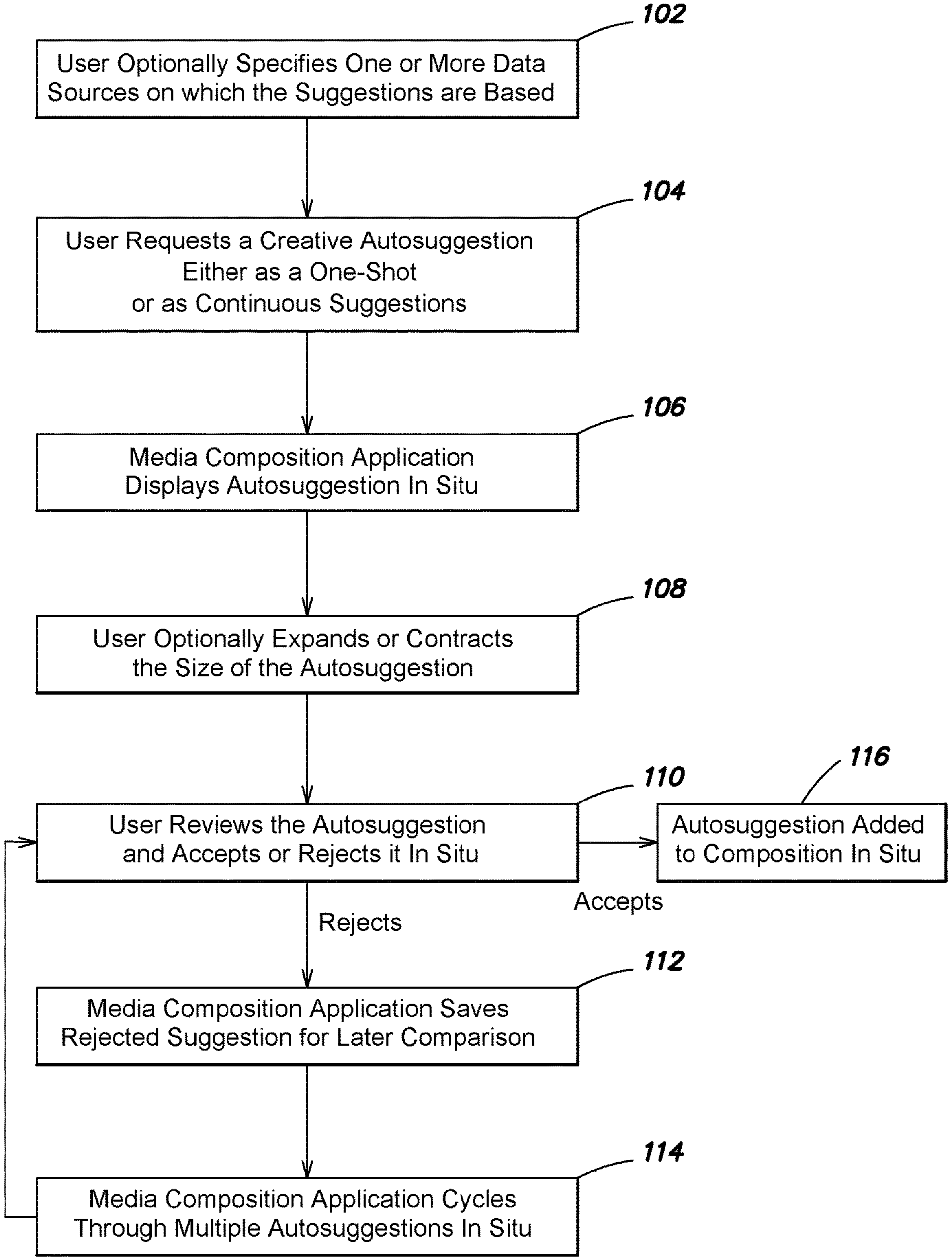
FIG. 1 is a flow diagram showing steps involved in composing a media composition using autosuggestion provided by a media composition application.

When users enter text into productivity applications such as word processors, email or text messengers, an autocompletion feature is commonly enabled. With this feature, users are offered one or more suggestions as to how to complete a partially entered word or phrase. The suggestions are chosen as the ones that the user is most likely to enter based on the corpus of text on which the autocompletion was trained. The aim is to offer the most probable continuation of the text entry, assuming that the user continues to generate text using the same paradigms and style used in the training corpus.

Applications for composing creative content may also benefit from such productivity-enhancing suggestions in which a user is provided with a most probable continuation or completion of an idea, referred to herein as a reductive suggestion. In addition, applications for composing creative content may use autocompletion in a second way, referred to herein as autosuggestion, which is a type of autocompletion that facilitates the exploration of creative ideas that may not be the most probable continuation of an idea. The suggestions provided by autosuggestion are referred to herein as exploratory suggestions. We describe reductive and exploratory suggestions below. As used herein, a creative content application or an application for composing creative content refers to media composition tools, such as musical scorewriter applications, digital audio workstations, and video composition applications. An example of a scorewriter application is Sibelius® from Avid Technology, Inc., of Burlington Massachusetts; an example of a digital audio workstation is Pro Tools®, also from Avid Technology, Inc.; and an example of a video composition application is Media Composer®, also from Avid Technology, Inc.

Reductive suggestions represent the most probable continuation of an idea. The probability of a continuation may be assessed from the current context within the composition in combination with previous entries of the user. These probabilities are generated by standard methods, such as those that involve one or more of Bayesian methods, Markoff chains, and n-gram probabilities. Successful reductive suggestions may increase the productivity of the user both by eliminating the need to contrive a continuation as well as by obviating the need to input a continuation since all the user needs to do is accept or reject the suggested autocompletion. The reduction in the number of keystrokes required may significantly accelerate the creative process in the context of content creation applications because certain objects in a composition often require many keystrokes for entry. For example, when composing a musical score with a scorewriter application, composers often make frequent use of musical motifs, riffs, and themes that repeat through the piece. Each of these can require many keystrokes for entry. When a user starts to enter the first few notes of a previously used musical motif, a reductive autocompletion system provides a suggestion consisting of the remainder of the motif.

The value of exploratory suggestions stems from the fact that creative content applications are typically free from many of the restrictions that apply to text entry in language-based applications such as word processing, text messaging, or database entry. Within the aesthetic context of a creative content application, the range of acceptable suggestions is large and there may not be a single "best" solution. Thus, while the goal of text-based autocompletion is usually to help a user complete a phrase or a sentence by reducing the total number of possible continuations to a single suggestion or a very small number of suggestions, autosuggestion within creative content applications may be used as a tool for exploring a large number of possible continuations, including the previewing of less commonly-used continuation ideas for the current creative context. This may set up a creative collaboration between the user and the application in which the application generates as many suggestions as the user needs based on user-specified parameters and prior content within the composition, and the user acts as a curator, choosing from among the exploratory suggestions. For example, when composing a musical score, composers often need to create a variation on an existing idea. Exploratory autosuggestions are able to provide a large variety of suggestions based on the existing idea that the user can preview rapidly, perhaps adopting one that is a novel continuation within that musical context.

Figure 2:
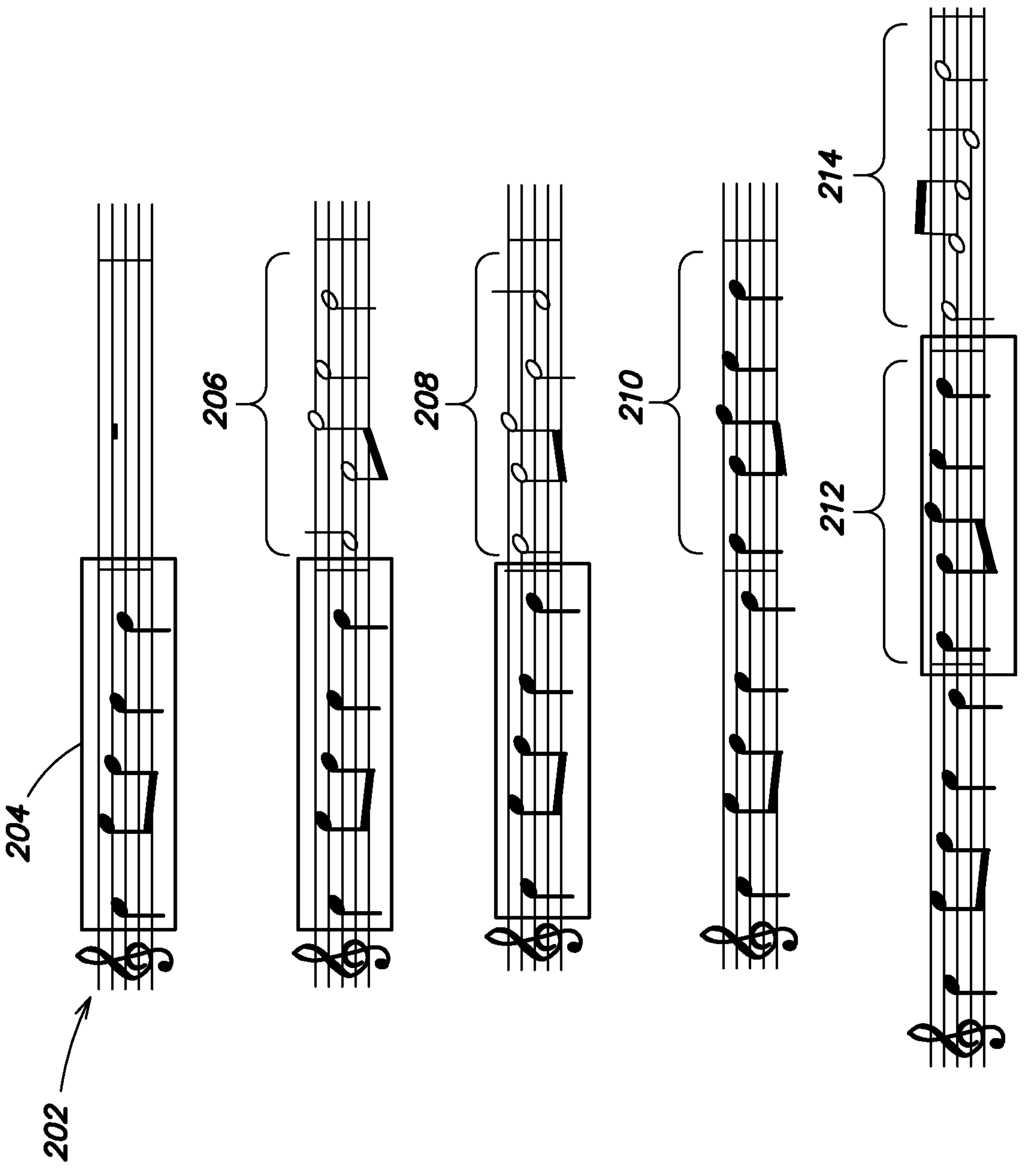
FIG. 2 illustrates a sequence of displays of a musical fragment with autosuggestion illustrating the steps involved when a user of a musical scorewriter application makes a selection of material from the work-in-progress to be used as the data source for generating the suggestion.

The described autosuggestion feature within a creative content application is displayed in situ within the composition. The user experience is illustrated in the high-level flow diagram shown in FIG. 1. The user optionally specifies the one or more data sources on which autocompletion suggestions are to be based (102). The source may be a selection of the current composition, the entire portion of the current composition that is available, some or all of another single composition, or it may be a corpus of existing material, such as some or all of the compositions of an individual composer (typically the user), a corpus of the works of composers in a given musical category or genre, or a large generic music database. FIG. 2 illustrates an example using a musical scorewriter application in which the user makes a selection of material from the work-in-progress to be used as the basis for generating the suggestion.

The user initiates the process by starting to enter a basic musical idea as shown in the first measure of stave 202. The user then selects the entered music as the basis for the autosuggestions, as indicated by shaded region 204. The selection of a single measure of source material may cause the autosuggestion process to default to generating suggestions of the same length, i.e., of a single measure, though the user may override this to choose another length for the suggestion. In addition, the content of the suggestion, e.g., pitch or rhythm patterns, is based on the user's current selection. Next, during the composition process, the user requests a creative autosuggestion (104) either explicitly or implicitly by continuing to enter material into the creative content application. A single suggestion may be offered as a "one-shot" or new suggestions may be offered continuously as the user continues entering material. The system displays the autosuggestion in situ (106) as shown at 206. The user interface distinguishes the existing material in the composition from the autosuggestion by using a distinctive graphical style or notation, such as by using a distinctive shading, boldness, or color, for the suggestion. The user may expand or contract the size of the autosuggestion (108). Next, the user reviews the autosuggestion (110). For a musical composition, the review enables the user to play back a portion of the composition ending with the suggestion. At this point, the user accepts or rejects the suggestion (110). Ways of rejecting a suggestion include continuing to input compositional material manually or requesting another autosuggestion. If the user rejects the suggestion and requests another suggestion, a different suggestion replaces the rejected suggestion as shown at 208. Rejected suggestions may be saved by the system so that users can return to a previous autocompletion suggestion even after it has been rejected (112). This allows users to preview a number of ideas in situ, while retaining the ability to return to the best generated suggestion. Users may request an unlimited number of suggestions until they find a suitable continuation or completion idea by repeatedly triggering the commands to generate a new suggestion (114). When the user is satisfied with a given suggestion, they accept the suggestion by triggering a command that inputs the suggestion into their score (116). At this point, the suggestion becomes a part of the composition and the display of the autosuggestion changes to match the graphical characteristics (e.g., shading, boldness, color) of the material already present in the composition, as shown at 210. The process then repeats, either automatically or in response to a user request, with another portion of the composition selected as the data source as shown at 212, and a new autosuggestion appears in the subsequent bar as shown at 214.

Figure 3:
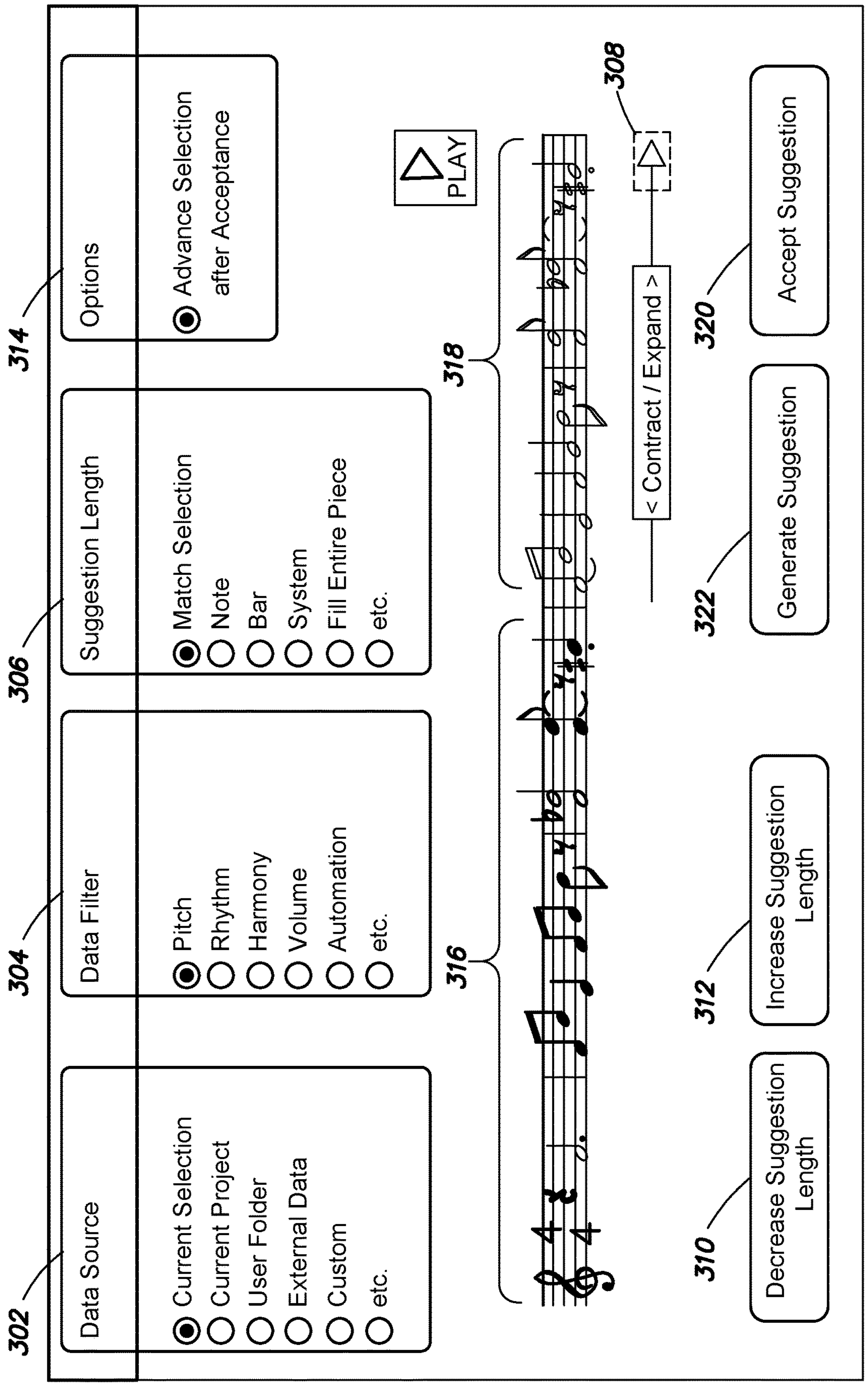
FIG. 3 is a diagram of a portion of a scorewriter application user interface offering customizable autosuggestion.

Autocompletion suggestions may be customized in several ways. A portion of a scorewriter application user interface offering customizable autosuggestion is shown diagrammatically in FIG. 3. The data source used to generate suggestions may be specified by the user, as illustrated in data source selection box 302. The three main categories of data source include: a subset of data from the current composition; all of the data from the current composition or project; and data external to the composition. In the example workflow provided above, autocompletion suggestions were generated using a subset of data from the current composition as defined by the user's selection. Using this category of data offers the ability to create a "repeat with variation" type of suggestion where the suggestion is likely to exhibit a high degree of similarity to the source material. Alternatively, when all of the data within the current composition is used for generating autocompletion suggestions, the system is able to identify and suggest commonly used motifs that have been used elsewhere in the composition. Data sources for autocompletion may be external, such as a corpus of all the user's previous works, or a corpus representing the work of a specific artist or composer, or a corpus representing a particular style or genre of content. Thus, by providing users with the ability to change the data source for suggestion generation, the autocomplete feature may be used to offer a variety of functions such as: repeating with variation, adding a motif from the current composition, suggesting something similar to the user's previous compositions, or suggesting something characteristic of a given artist, style, or genre.

Another method of customization of autocomplete suggestions makes use of data filters. Once a data source has been chosen by a user, the data source may be filtered to include or exclude certain aspects of the data, as illustrated with data filter box 304. Filters allow a given data source to be used for creating various types of suggestions in which an aspect of the data source, such as rhythm, melody, harmony, lyrics, and bass line suggestions is preserved while one or more of the other facets are varied in the suggestion. For example, if pitch is selected as shown in data filter box 304, new pitch ideas are generated based on the pitches from the data source, while other information from the data source, such as rhythm is explicitly retained. This corresponds to the example illustrated in FIG. 2. Alternatively, a user may choose to have autosuggestions retain the pitch content of the data source while generating new rhythms. Another use case preserves both pitch and rhythm of the data source, while making novel suggestions for one or more playback parameters such as volume, reverb, and panning.

The length of the autocompletion suggestions may be varied, ranging from small-scale suggestions as small as a single note, to large-scale suggestions up to and including material suggested for the remainder of the composition. This contrasts with language-based autocompletion systems in which the length of the suggestion is not customizable. An exemplary user interface for this customization is shown in suggestion length box 306. In the illustrated example, other means of changing the length of the suggestion include drag bar 308, and discrete increase and decrease length selection commands 310, 312. In the example described above, the default suggestion length is set to equal that of the source data (i.e., one bar). Thus, one way to change the suggestion length is to select a longer or shorter source data fragment. However, the system enables the user to override this default and set the suggestion length to a desired value regardless of the source material length. Factors that may inform a user's choice of suggestion length include the quality of the suggestions, and whether they tend to start off well, and then deteriorate. In one implementation, a user may decide on a case by case basis whether to extend the length of a suggestion based on their assessment of an initial suggestion. Another factor may be the need to fit a suggestion into a predefined duration. For example, if a user has been using two-bar suggestions but only a single bar remains in the piece, the user may select a shorter suggestion length.

Other autosuggestion-related customization may be offered, such as whether a portion of the composition in progress that is selected as the data source for the autosuggestion is automatically advanced following acceptance of a suggestion, as shown in options box 314. In the illustrated user interface, material that is already incorporated into the composition 316 is distinguished from autosuggestion material 318 in the user interface by means of its graphical style or notation, for example by having a distinctive shading, color, boldness, font type.

Following the display of each new suggestion, the user may either accept the suggestion or request a new autosuggestion, using user elements such as buttons 320 and 322 respectively.

Figure 4:
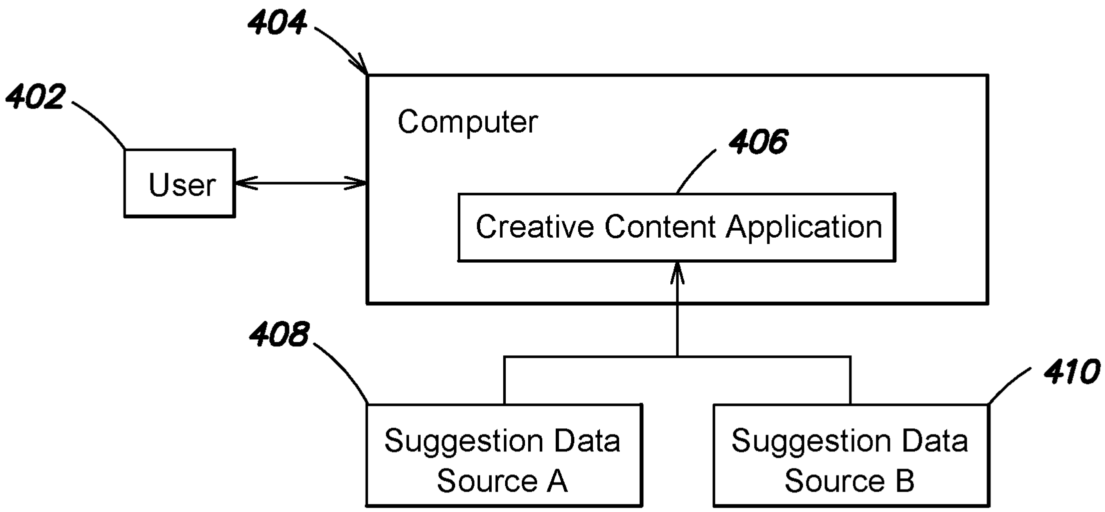
FIG. 4 is a high-level block diagram of an exemplary system for creative content autosuggestion.

FIG. 4 is a high-level block diagram of an exemplary system for creative content autocompletion. User 402 interacts with computer 404 hosting creative content application 406, which may be a scorewriter application or a digital audio workstation application. The creative content application is in data communication with one or more local or remote suggestion data sources 408, 410. The data sources may be databases of music of a particular composer or genre, or a large generic music collection. Multiple data sources may be combined to create a master data source, or each could be used individually to supply different aspects of the data used for autosuggestion. For example, one source may provide melodies, another may provide harmonizations, and a third may provide rhythms. To take a particular example of this, the user may cause the autosuggestion to generate melodies that sound like the Beatles, harmonized in the style of Bach, and with rhythms of a modern composer such as Brian Ferneyhough.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a text keyboard, musical keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of composing a media composition, the method comprising:
- providing a media composition application;
- while a user of the media composition application is entering media content for the media composition into the media composition application, automatically displaying a first suggestion for a continuation of the media composition, wherein the suggestion is displayed:
  - as a continuation of the media composition adjacent and sequential to a preceding portion of the media composition; and
  - using a graphical style that distinguishes it from a graphical style of the preceding portion of the media composition; and
- enabling the user to accept or reject the first suggestion, wherein when the user accepts the first suggestion, the first suggestion is incorporated into the composition and the first suggestion is redisplayed using the graphical style of the preceding portion of the media composition; and when the user rejects the first suggestion, a second suggestion for continuation of the media composition is automatically displayed.

2. The method of claim 1, wherein the media composition application is a musical scorewriter application.

3. The method of claim 1, wherein the media composition application is a digital audio workstation.

4. The method of claim 1, wherein the media composition application is a video composition application.

5. The method of claim 1, wherein the first suggestion is based on a portion of the media composition.

6. The method of claim 5, wherein the portion is the preceding portion of the media composition.

7. The method of claim 5, wherein the portion of the media composition is specified by the user.

8. The method of claim 1, wherein the first suggestion is based on all of the media composition that has already been entered into the media composition application.

9. The method of claim 1, wherein the first suggestion is based on a corpus of media compositions of a given genre.

10. The method of claim 1, wherein the first suggestion is based on a corpus of media compositions composed by one or more composers.

11. The method of claim 1, wherein the first suggestion is based on a first data source that comprises a plurality of aspects, and wherein the first suggestion preserves a first aspect of the first data source and varies a second aspect of the plurality of aspects.

12. The method of claim 11, wherein the media composition application is a musical scorewriter, the first data source comprises a fragment of a musical score, and the first aspect is one of a rhythm of the fragment, a melody of the fragment, a harmony of the fragment, a lyric of the fragment, and a bass line of the fragment.

13. The method of claim 11, wherein the first suggestion is further based on a second data source that comprises a plurality of aspects, and wherein the first suggestion preserves a first aspect of the second data source and varies a second aspect of the second data source.

14. The method of claim 13, wherein the first aspect of the first data source is a melody aspect.

15. The method of claim 14, wherein the first aspect of the second data source is one of a rhythm aspect and a harmonization aspect.

16. The method of claim 1, wherein a length of the first suggestion matches a length of a portion of the media composition that has been selected to provide a basis from which the suggestion is to be generated.

17. The method of claim 1, wherein a length of the first suggestion is selectable by the user.

18. The method of claim 1, wherein a length of the first suggestion is automatically determined by the media composition application to fill a length required to complete the media composition.

19. A computer program product comprising:

a non-transitory computer-readable medium with computer-readable instructions encoded thereon, wherein the computer-readable instructions, when processed by a processing device instruct the processing device to perform a method of composing a media composition, the method comprising:

providing a media composition application;

while a user of the media composition application is entering media content for the media composition into the media composition application, automatically displaying a first suggestion for a continuation of the media composition, wherein the suggestion is displayed:

as a continuation of the media composition adjacent and sequential to a preceding portion of the media composition; and using a graphical style that distinguishes it from a graphical style of the preceding portion of the media composition; and enabling the user to accept or reject the first suggestion, wherein when the user accepts the first suggestion, the first suggestion is incorporated into the composition and the first suggestion is redisplayed using the graphical style of the preceding portion of the media composition; and when the user rejects the first suggestion, a second suggestion for continuation of the media composition is automatically displayed.

20. A system comprising:

a memory for storing computer-readable instructions; and a processor connected to the memory, wherein the processor, when executing the computer-readable instructions, causes the system to perform a method of composing a media composition, the method comprising:

providing a media composition application;

while a user of the media composition application is entering media content for the media composition into the media composition application, automatically displaying a first suggestion for a continuation of the media composition, wherein the suggestion is displayed:

as a continuation of the media composition adjacent and sequential to a preceding portion of the media composition; and using a graphical style that distinguishes it from a graphical style of the preceding portion of the media composition; and enabling the user to accept or reject the first suggestion, wherein when the user accepts the first suggestion, the first suggestion is incorporated into the composition and the first suggestion is redisplayed using the graphical style of the preceding portion of the media composition; and when the user rejects the first suggestion, a second suggestion for continuation of the media composition is automatically displayed.

* * * * *